US011099959B2

(12) United States Patent
Ota

(10) Patent No.: US 11,099,959 B2
(45) Date of Patent: Aug. 24, 2021

(54) IMAGE PROCESSING DEVICE AND NON-TRANSITORY RECORDING MEDIUM

(71) Applicant: KONICA MINOLTA, INC., Tokyo (JP)

(72) Inventor: Akito Ota, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 129 days.

(21) Appl. No.: 16/260,707

(22) Filed: Jan. 29, 2019

(65) Prior Publication Data
US 2019/0294518 A1    Sep. 26, 2019

(30) Foreign Application Priority Data

Mar. 22, 2018  (JP) ............................. JP2018-054108

(51) Int. Cl.
| G06F 11/00 | (2006.01) |
| G06F 11/30 | (2006.01) |
| G06F 11/34 | (2006.01) |
| G06F 11/07 | (2006.01) |

(52) U.S. Cl.
CPC ........ *G06F 11/3013* (2013.01); *G06F 11/004* (2013.01); *G06F 11/0733* (2013.01); *G06F 11/34* (2013.01)

(58) Field of Classification Search
CPC .... G06F 11/34; G06F 11/004; G06F 11/0733; G06F 11/0784; G06F 11/3013; G06F 11/008; G06F 3/1273; G06F 3/1229; G06F 3/1203; G06F 3/1287; H04N 1/00244; H04N 1/00896; H04N 1/00217
See application file for complete search history.

(56) References Cited

U.S. PATENT DOCUMENTS

| 2002/0116480 A1* | 8/2002 | Muto ...................... H04L 41/00 709/220 |
| 2009/0033993 A1* | 2/2009 | Nakazato ............... G06F 3/1218 358/1.15 |
| 2013/0019128 A1* | 1/2013 | Yamasaki ............ G06F 11/0775 714/45 |
| 2016/0139994 A1* | 5/2016 | Matsumoto ........ H04N 1/32625 714/15 |
| 2016/0224279 A1* | 8/2016 | Kim ........................ H04L 67/10 |

FOREIGN PATENT DOCUMENTS

JP          2016146020 A     8/2016

* cited by examiner

*Primary Examiner* — Joseph D Manoskey
(74) *Attorney, Agent, or Firm* — Buchanan Ingersoll & Rooney PC

(57) ABSTRACT

An image processing device capable of repeatedly sending internal data stored inside the device to a server at a predetermined timing, comprises: a hardware processor that: obtains the internal data from the inside the device at every data transmission timing; determines whether or not to send the latest internal data obtained at the current data transmission timing to the server based on a change in an operation status during a period from the previous data transmission timing to the current data transmission timing; and sends the latest internal data to the server when determining to send the latest internal data to the server.

17 Claims, 10 Drawing Sheets

FIG. 6

INTERNAL DATA 9

| DATA ITEM | PART FROM WHICH DATA IS OBTAINED | DATA TYPE |
|---|---|---|
| SCAN COUNTER | SCANNER SECTION | COUNT VALUE |
| PRINT COUNTER | PRINTER SECTION | COUNT VALUE |
| CUTTING COUNTER | POST-PROCESSING UNIT | COUNT VALUE |
| ⋮ | ⋮ | ⋮ |
| SLID DISTANCE OF PHOTORECEPTER (YELLOW) | PRINTER SECTION | SENSOR MEASURED VALUE |
| SLID DISTANCE OF PHOTORECEPTER (MAGENTA) | PRINTER SECTION | SENSOR MEASURED VALUE |
| SLID DISTANCE OF PHOTORECEPTER (CYAN) | PRINTER SECTION | SENSOR MEASURED VALUE |
| SLID DISTANCE OF PHOTORECEPTER (BLACK) | PRINTER SECTION | SENSOR MEASURED VALUE |
| SLID DISTANCE OF INTERMEDIATE TRANSFER BELT | PRINTER SECTION | SENSOR MEASURED VALUE |
| RUNNING DISTANCE OF TRANSFER ROLLER | PRINTER SECTION | SENSOR MEASURED VALUE |
| SLID DISTANCE OF FIXING BELT | PRINTER SECTION | SENSOR MEASURED VALUE |
| ⋮ | ⋮ | ⋮ |
| LOG DATA | STORAGE DEVICE | TEXT |
| ⋮ | ⋮ | ⋮ |

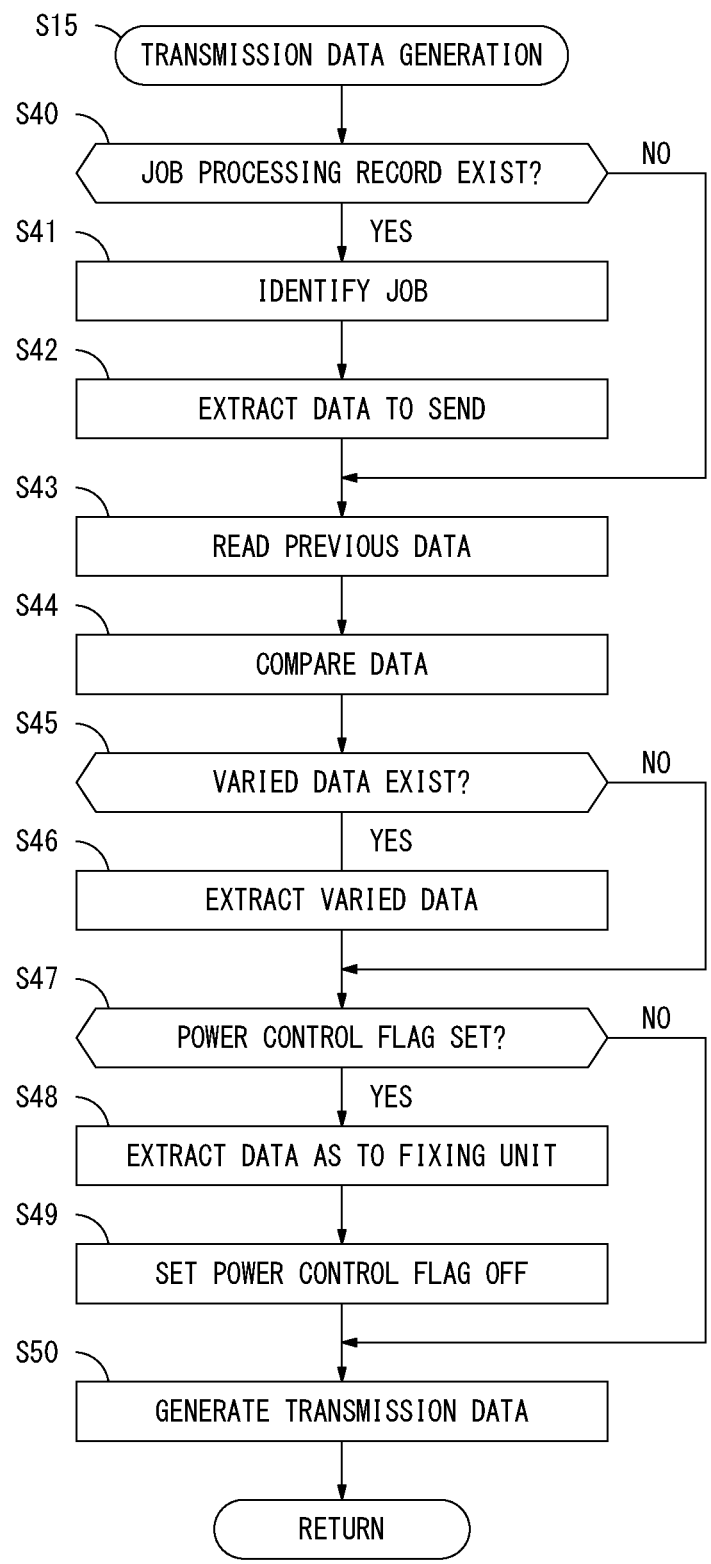

IMAGE PROCESSING DEVICE AND NON-TRANSITORY RECORDING MEDIUM

Japanese patent application No. 2018-054108 filed on Mar. 22, 2018 including description, claims, drawings, and abstract the entire disclosure is incorporated herein by reference in its entirety.

BACKGROUND

Technological Field

The present invention relates to an image processing device and a non-transitory recording medium. The present invention more specifically relates to a technique for the image processing device to send data to a server.

Description of the Related Art

Image processing devices such as MFPs (Multifunction Peripherals) are installed in various places around the world. Various types of parts that become operative in job processing are equipped with the image processing device. Some of the parts may cause failures or may reach a service life end. In such a case, the image processing device is not capable of processing a job normally. Hence, the image processing device is equipped with a variety of sensors and/or counters to monitor operation statuses of those parts.

As one of conventional failure prediction systems, a system that enables a server to collect internal data such as sensor measured values measured by the variety of sensors and/or count values of the counters from the image processing device, and analyze the collected internal data is known. This known technique is introduced for example in Japanese Patent Application Laid-Open No. JP 2016-146020 A (a document 1). According to the known technique, the data is sent to the server in the failure prediction system from the multiple image processing devices installed in all over the world, and it is desirable to reduce the load on the server. The conventional prediction system according to the document 1, therefore, sets a frequency that the server obtains data from the image processing device low to analyze the obtained data. If there is the image processing device that is determined to be abnormal based on the data obtained at a low frequency, the frequency of obtaining data from the image processing device that is determined to be abnormal is set high so that increase in the load on the server is prevented.

In the aforementioned conventional prediction system, however, if there are more and more number of the image processing devices determined to be abnormal, the server needs to obtain the data at the higher frequency from the multiple image processing devices. The load on the server in the conventional prediction system may be increased, not resulting in effective reduction of the load on the server.

SUMMARY

The present invention is intended to solve the above problems. Thus, the present invention is intended to provide an image processing device and a non-transitory recording medium capable of effectively reducing a load on a server.

First, the present invention is directed to an image processing device capable of repeatedly sending internal data stored inside the device to a server at a predetermined timing.

To achieve at least one of the abovementioned objects, according to an aspect of the present invention, the image processing device reflecting one aspect of the present invention comprises: a hardware processor that: obtains the internal data from the inside the device at every data transmission timing; determines whether or not to send the latest internal data obtained at the current data transmission timing to the server based on a change in an operation status during a period from the previous data transmission timing to the current data transmission timing; and sends the latest internal data to the server when determining to send the latest internal data to the server.

Second, the present invention is directed to a non-transitory recording medium storing a computer readable program to be executed by a hardware processor in an image processing device capable of repeatedly sending internal data stored inside the device to a server at a predetermined timing.

To achieve at least one of the abovementioned objects, according to an aspect of the present invention, the non-transitory recording medium reflecting one aspect of the present invention stores the computer readable program, execution of the computer readable program by the hardware processor in the image processing device causing the hardware processor to perform: obtains the internal data from the inside the device at every data transmission timing; determines whether or not to send the latest internal data obtained at the current data transmission timing to the server based on a change in an operation status during a period from the previous data transmission timing to the current data transmission timing; and sends the latest internal data to the server when determining to send the latest internal data to the server.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 6 illustrates an example of internal data obtained by a data obtaining part;

FIG. 10 illustrates a flow diagram explaining an exemplary procedure of a transmission data generation in detail.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
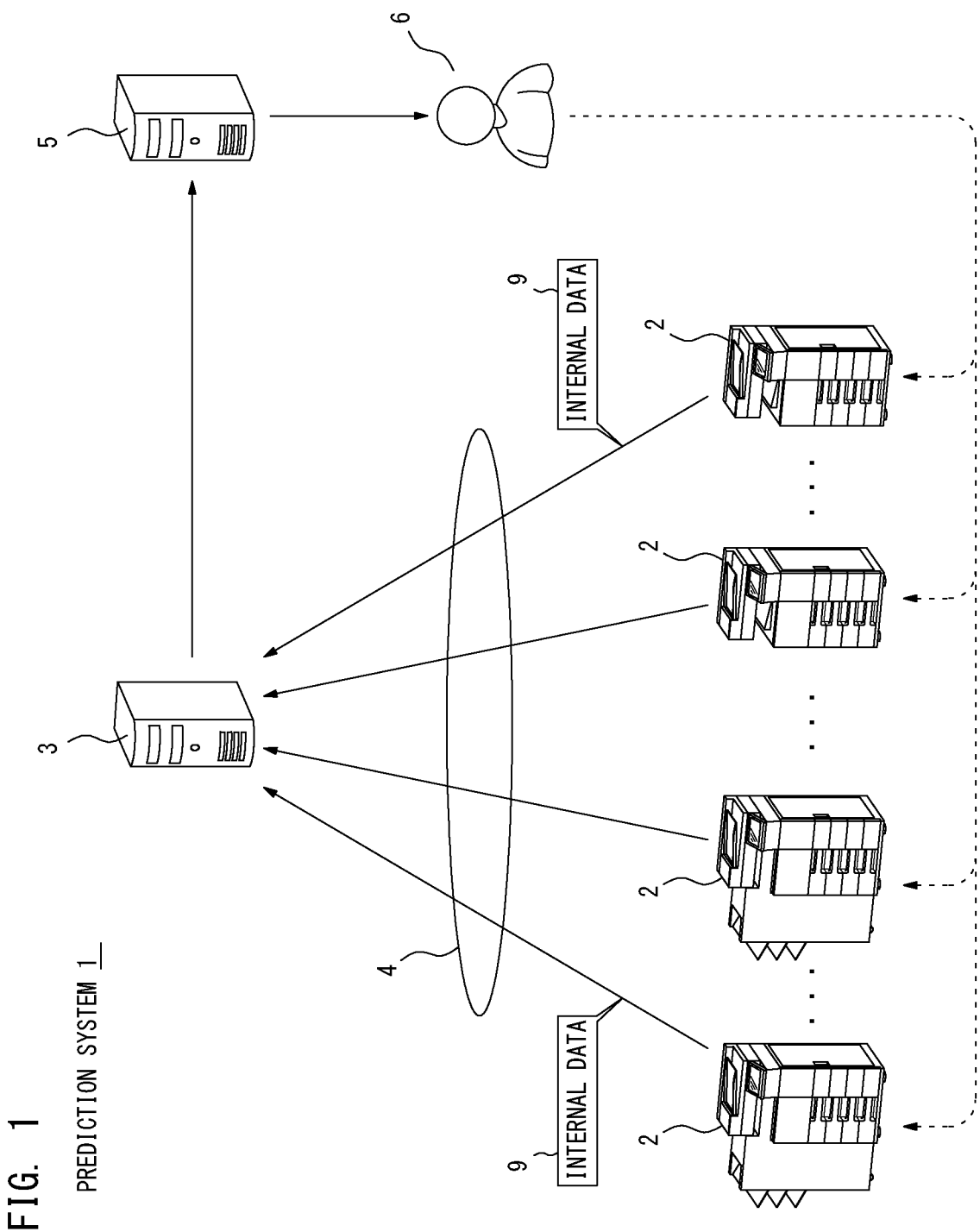
FIG. 1 illustrates an exemplary configuration of a prediction system that predicts a failure, for instance, of an image processing device.

FIG. 1 illustrates an exemplary configuration of a prediction system 1 that predicts a failure, for instance, of an image processing device 2 in which the first preferred embodiment of the present invention may be practiced. The prediction system 1 includes multiple image processing devices 2, a server 3 and an analyzing device 5. The multiple image processing devices 2 are installed in various places all over the world. The server 3 collects internal data 9 from each of the multiple image processing devices 2. The analyzing device 5 analyzes the internal data 9 collected by the server 3 so that predicting the failure and/or an end of a service life of a part equipped with each image processing device 2.

The image processing device 2 may be one of MFPs, for example, including multiple functions such as a scan function, a print function and/or a copy function. The image processing device 2 receives a function selecting operation by a user and processes a job based on a job processing instruction input by the user. The image processing device 2 processes a variety of jobs including, for instance, scan jobs, print jobs and copy jobs. The image processing device 2 with a fax function, for example, is capable of processing the job to send and receive fax data. Also, a post-processing unit 2b may be provided with the image processing device 2 as described later.

The image processing device 2 is connected to the server 3 over a network 4 including internet, for example. The image processing device 2 is capable of communicating with the server 3. The image processing device 2 sends the internal data 9 to manage and monitor various types of parts mounted inside to the server 3 at every interval of constant time.

After receiving the internal data 9 from each of the multiple image processing devices 2, the server 3 provides the analyzing device 5 with the received internal data 9. The analyzing device 5 analyzes the internal data 9 of each image processing device 2 to predict in advance the failure or the end of the service life of the various types of the parts mounted inside each image processing device 2. If there is a possibility of occurrence of the failure of the part mounted inside the image processing device 2 or the part is approaching the service life, the analyzing device 5 notifies and requests a maintenance/inspection person 6 who is close to an installation site of the image processing device 2 to perform maintenance/inspection work. The maintenance/inspection person 6 visits the installation site of the image processing device 2 and performs the maintenance/inspection work so that the maintenance/inspection work enables the image processing device 2 to maintain a state that can process the job.

Figure 2:
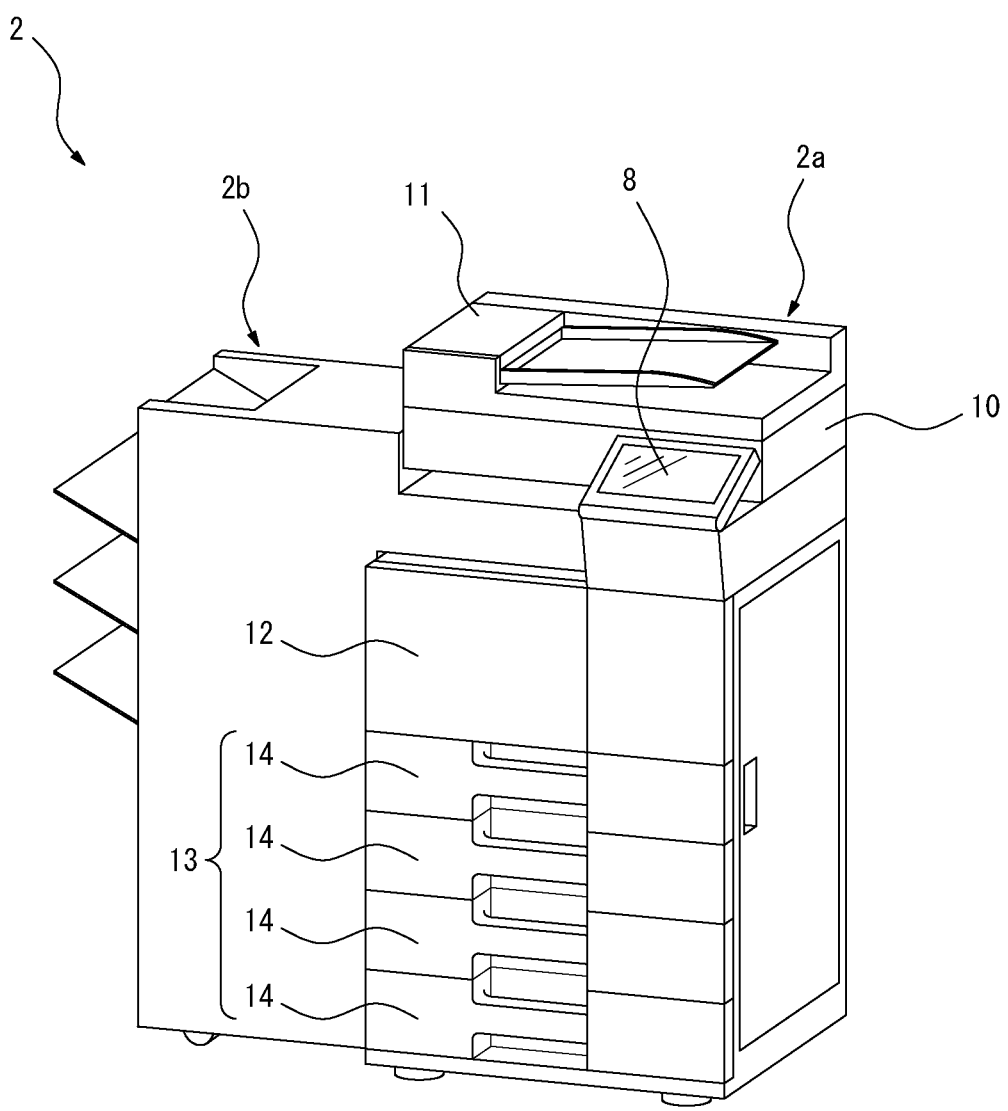
FIG. 2 illustrates an example of a structure of the image processing device.

FIG. 2 illustrates an example of a structure of the image processing device 2. The image processing device 2 of FIG. 2 includes a device body 2a to which a post-processing unit 2b is attached. The post-processing unit 2b is an optional device to be attached to the device body 2a. The post-processing unit 2b adds optional functions such as a staple function, a punching function and/or a cutting function to the image processing device 2. If the optional function is not required, the post-processing unit 2b is not attached to the device body 2a. The image processing device 2 does not always have to attach the post-processing unit 2b. The image processing device 2 may only include the device body 2a.

The image processing device 2 includes a scanner section 10 and an automatic document carrier (hereafter, ADF) in an upper part of the device body 2a. The scanner section 10 and the ADF 11 work together with each other when the image processing device 2 processes the scan job or the copy job. The scanner section 10 optically reads an image of a document and generates image data. The ADF 11 is provided in an upper part of the scanner section 10 to automatically feed the document placed by the user one by one to a document reading position to be read by the scanner section 10.

The image processing device 2 includes a printer section 12 and a paper feeder 13 in a lower part of the device body 2a. The printer section 12 and the paper feeder 13 work together with each other when the image processing device 2 processes the print job or the copy job. The paper feeder 13 includes multiple paper feeding cassettes 14. In each of the multiple paper feeding cassettes 14, papers in different directions and sizes may be set. Upon start of processing of the print job or the copy job, the paper feeder 13 feeds the paper one by one from the paper feeding cassette 14 in which the paper specified by the user is stocked to the printer section 12. The printer section 12 forms images on the paper fed from the paper feeder 13 based on the input image data and produces a printed output.

When the post-processing unit 2b is attached to the device body 2a, the paper output from the printer section 12 is carried to the post-processing unit 2b. The post-processing unit 2b performs a processing designated by the user such as a stapling or a punching to the printed output on which the image is formed and outputs.

The image processing device 2 includes an operational panel 8 at the front side of the device body 2a. The operational panel 8 serves as a user interface for the user to use the image processing device 2.

Figure 3:
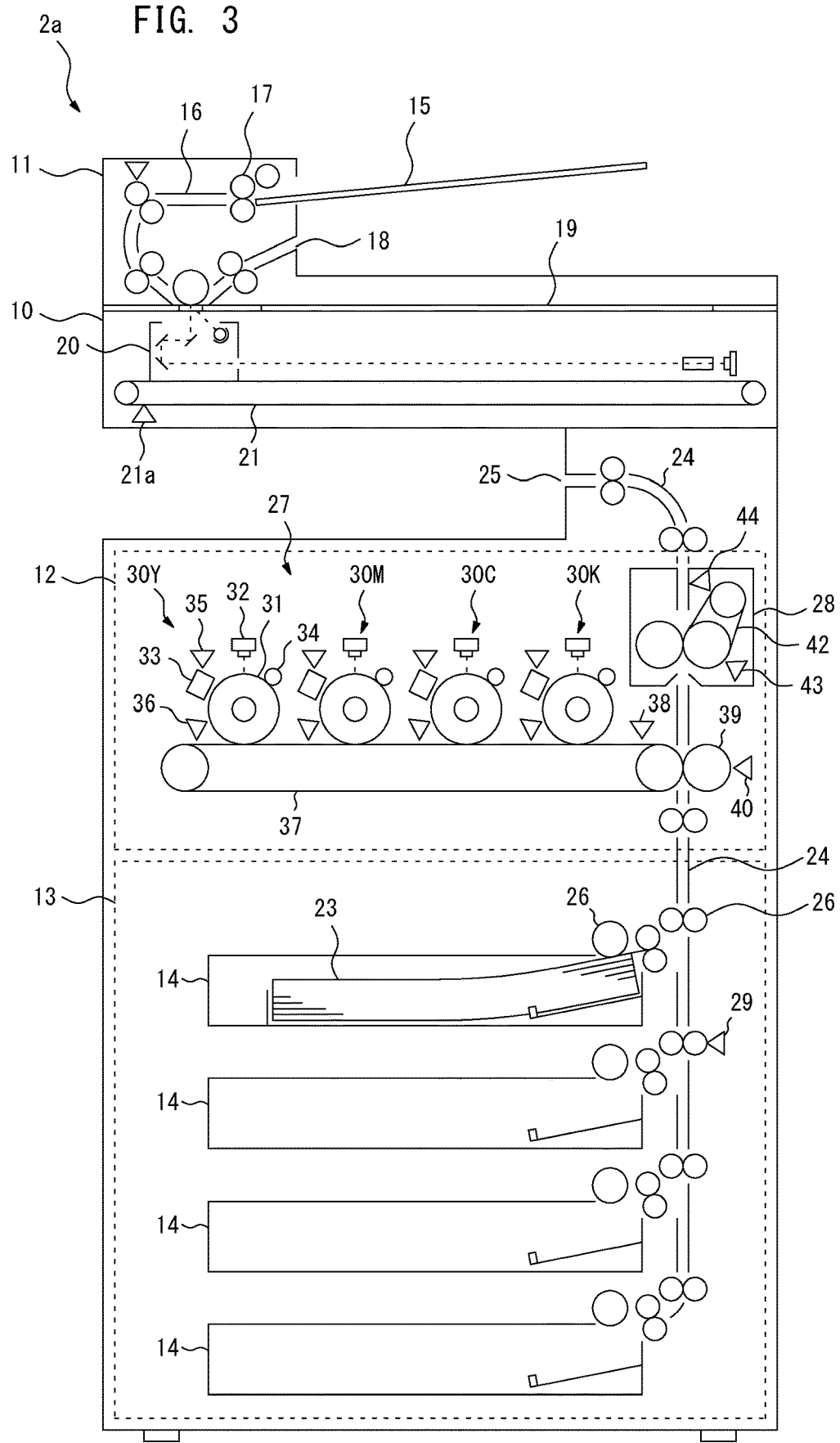
FIG. 3 illustrates an exemplary internal structure of a device body of the image processing device.

FIG. 3 illustrates an exemplary internal structure of the device body 2a of the image processing device 2. The scanner section 10 includes a reading head 20, a driving belt 21 and a sensor 21a. The reading head 20 irradiates light to the document carried by the ADF 11, and leads reflected light from the document to photoelectric conversion element. The reading head 20 is also configured to read the document placed on a platen glass 19. More specifically, the reading head 20 may be moved in a vertical scanning direction. The reading head 19 moves in the vertical scanning direction with reading the image of the document placed on the platen glass 19 in the main scanning direction so that it reads the image of the document. The sensor 21a measures slid distance of the driving belt 21. If the driving belt 21, for example, is driven for more than a predetermined distance, it is time to replace the driving belt 21. In order to predict the replacement time of the driving belt 21, the sensor 21a measures the slid distance of the driving belt 21 and monitors the operation status of the driving belt 21.

The ADF 11 includes a document tray 15 on which the document is placed, a carrier path 16 to carry the document and a carrier roller 17. The carrier roller 17 carries each document set on the document tray 15 to the carrier path 16, and the document is ejected from an ejecting port 18. Movable part such as the carrier roller 17 is also provided with the ADF 11. The sensor to monitor the operation status of the movable part is also equipped inside the ADF 11.

The paper feeder 13 and the printer section 12 include a carrier path 24 that carries a paper 23. The carrier path 24 is communicated with an ejecting port 25 which is provided in the upper part of the printer section 12.

The paper feeder 13 includes multiple rollers 26 and a sensor 29. The roller 26 takes out each paper 23 stocked in the paper feeding cassette 14 and carries along the carrier path 24. The paper feeder 13 rotates each roller 26 to carry the paper 23. The paper feeder 13 includes a sensor 29 that measures a travelling distance (rotation) of each roller 26. If the roller 26, for example, is driven for more than a predetermined distance (rotation), it is time to replace the roller 26. In order to predict the replacement time of the roller 26, the sensor 29 measures the traveling distance (rotation) of the roller 26 and monitors the operation status of the roller 26.

The printer section 12 includes an image forming unit 27 and a fixing unit 28. The image forming unit 27 uses four colors, Y (yellow), M (magenta), C (cyan) and B (black) to form a color image. The image forming unit 27 includes image forming units 30Y, 30M, 30C and 30K corresponding to the respective four colors.

The image forming unit 30Y includes a photoreceptor drum 31, an exposure unit 32, a developing unit 33 and an electrifying unit 34. The exposure unit 32 exposes a surface of the photoreceptor drum 31 and forms an electrostatic latent image based on the image data. The developing unit 33 provides a toner with the electrostatic latent image and forms a toner image on the surface of the photoreceptor drum 31. The electrifying unit 34 electrifies the surface of the photoreceptor drum 31. A sensor 35 to measure toner remaining amount is arranged near the developing unit 33. Also, a sensor 36 to measure a slid distance of the photoreceptor drum 31 is arranged near the photoreceptor drum 31. If there is no remaining toner in the developing unit 33, for instance, it is time to replace a toner bottle. If the slid distance reaches more than a predetermined distance, it is time to replace the photoreceptor drum 31. The sensors 35 and 36 are provided to predict the replacement timings of the respective parts. Each of the image forming units 30M, 30C and 30K has the similar structure.

The toner image formed on the photoreceptor drum 31 is transferred to an intermediate transfer belt 37. The intermediate transfer belt 37 sequentially transfers the four colors toner image so that it may form a color image on a surface of the belt. The color image formed on the intermediate transfer belt 37 is transferred again to the paper 23 when the paper 23 fed from the paper feeder 13 passes through a transfer roller 39. A sensor 38 to measure a slid distance of the intermediate transfer belt 37 is arranged near the intermediate transfer belt 37. Also, a sensor 40 to measure a running distance of the transfer roller 39 is arranged near the transfer roller 39. The sensors 38 and 40 are provided to predict the replacement timings of the respective parts by monitoring operation status of the intermediate transfer belt 37 or the transfer roller 39. The paper 23 to which the color image is transferred by the transfer roller 39 is then carried to the fixing unit 28. The fixing unit 28 carries out a fixing process of the color image transferred on the surface.

The fixing unit 28 includes a fixing belt 42. The fixing belt 42 performs a heating treatment and a pressure processing to the paper 23 to which the color image is transferred to fix the color image to the paper 23. The fixing unit 28 includes sensors 43 and 44. The sensor 43 is to measure a temperature of the fixing belt 42, and the sensor 44 is to measure a slid distance of the fixing belt 42. More specifically, the sensors 43 and 44 are provided to monitor the operation status of the parts equipped with the fixing unit 28 to predict the replacement time. The paper 23 to which the color image is fixed by the fixing unit 28 is ejected from the ejecting port 25. If there is the attached post-processing unit 2b, the paper 23 ejected from the ejecting port 25 is carried to the post-processing unit 2b.

As described above, each sensor to monitor the operation status of each part provided inside is mounted inside the image processing device 2. The sensor measured value measured by each sensor forms the internal data 9.

Figure 4:
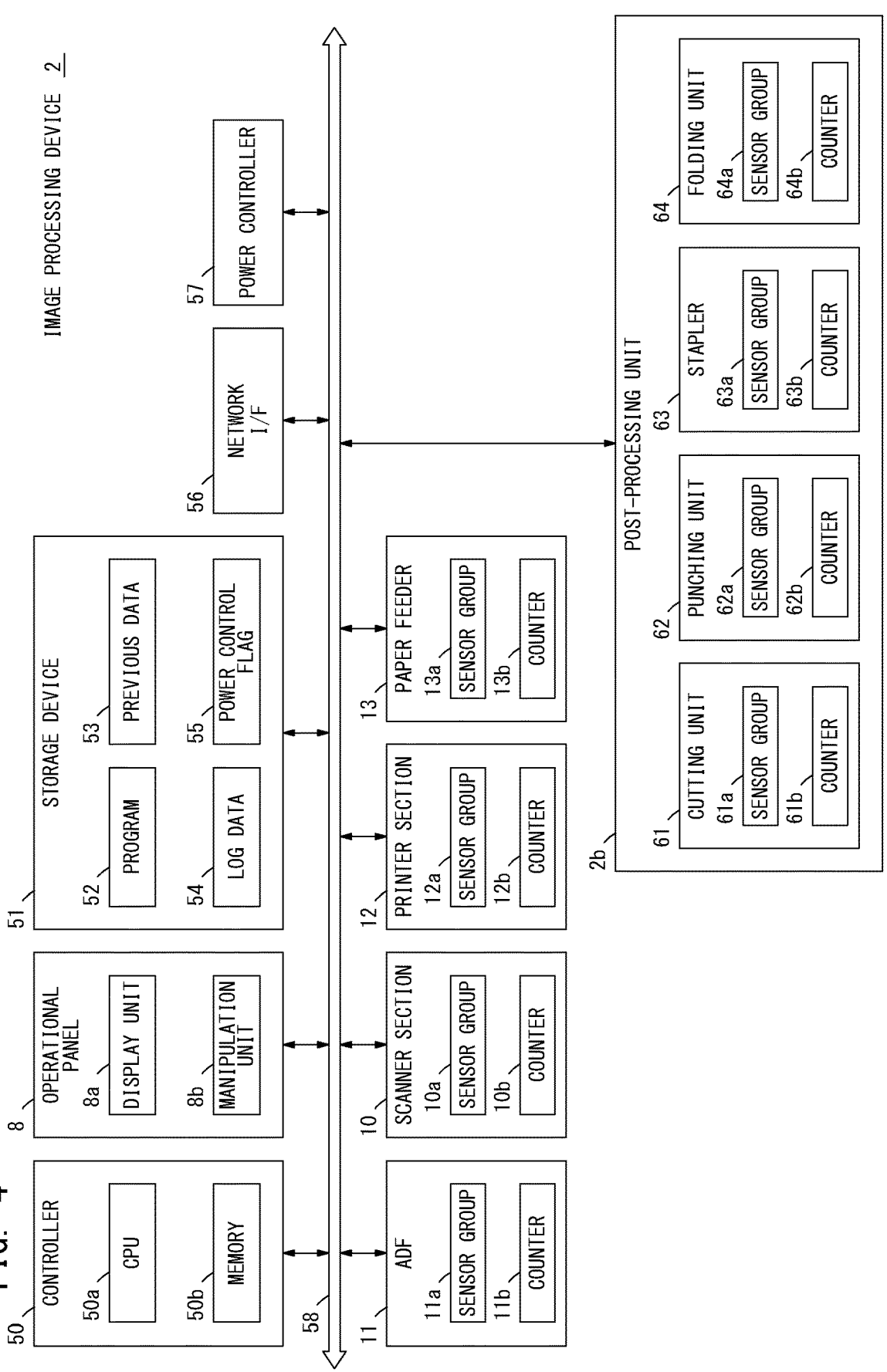
FIG. 4 illustrates a block diagram showing an example of a hardware structure to perform an electronical control at the image processing device.

FIG. 4 illustrates a block diagram showing an example of a hardware structure to perform an electronical control at the image processing device 2. The image processing device 2 includes a controller 50, the operational panel 8, a storage device 51, a network interface 56, a power controller 57, the ADF 11, the scanner section 10, the printer section 12, the paper feeder 13 and the post-processing unit 2b. Each of those parts may input and output the data to and from each other via a data bus 58.

The controller 10 including a CPU 50a and a memory 50b controls overall operation of the image processing device 2. The CPU 50a is a hardware processor that may execute a program 52. Once the image processing device 2 is powered, the CPU 50a, for instance, reads and executes the program 52 stored in the storage device 51 so that the CPU 50a serves as a variety of processing parts described later, and controls operations of each part. Especially in the present preferred embodiment, the CPU 50a executes the program 52 so that the controller 50 determines whether or not to send the internal data 9 to the server 3 at every interval of constant time. When determining to send the internal data 9, the controller 50 sends the internal data 9 to the server 3. Data, for instance, used when the CPU 50a processes processing based on the program 52 is temporarily stored in the memory 50b.

The operational panel 8 includes a display unit 8a and a manipulation unit 8b. The display unit 8a is constructed by a device such as a color liquid crystal display, for instance, and displays a variety of screens operable for the user. The manipulation unit 28b constructed by touch panel keys, for instance, arranged on a display area of the display unit 8a receives the user operation.

The storage device 51 is formed from a non-volatility storage device such as a hard disk drive (HDD), for example. Previous data 53, log data 54 and a power control flag 55 are stored in the storage device 51 besides the aforementioned program 52. The previous data 53 is collected from each part at a time of previous transmission of the internal data 9. Information such as a job processing history at the image processing device 2 is stored as the log data 54. The log data 54 includes information such as detailed information of the processed job and/or information of date and time of the job processing. When power supply to each part is terminated or a status is entered to sleep status by the power controller 57, the controller 50 stores the power control flag 55 in the storage device 51.

The network interface 56 is to connect the image processing device 2 to the network 4. The image processing device 2 communicates with the server 3 via the network interface 56.

The power controller 57 controls the power supplied to each part of the image processing device 2. Once a power switch which is not illustrated in FIG. 4 is turned on in response to the user operation, for example, the power controller 57 starts the power supply to each part. When detecting that the power switch is turned off in response to the user operation, the power controller 57 terminates the power supply to each part. Prior to the termination of the power supply to each part, the power controller 57 notifies the controller 50 of the termination of the power supply, and terminates the power supply to each part after the controller 50 sets the power control flag 55 in the storage 51.

In response to receiving an instruction to shift to a power saving mode from the controller 50, the power controller 57 enables to shift the power supply status to the sleep status. In the sleep status, the power supply to the parts such as the controller 50, the display unit 8a of the operational panel 8 and the printer section 12 is stopped and consumed power may be saved more than the normal power supplied status. The user operation may be detected by the manipulation unit 8b of the operational panel 8 or the job may be received by the network interface 56 during the sleep status. In such a case, the instruction to return to the normal power supplied status is sent to the power controller 57. The power controller 57 then controls to return to the normal power supplied status from the sleep status. Once the power status is returned to the normal power supplied status, the power supply to each part is restarted. The controller 50 is then also allowed to perform the normal operations.

The ADF 11 includes a group of sensors 11a and a counter 11b. The group of sensors 11a includes at least one sensor that monitors the operation status of movable parts that become operative when the ADF 11 carries the document. The group of sensors 11a outputs the sensor measured value which is obtained by measuring the operation status of the movable part to the controller 50 as one type of data contained in the internal data 9 based on a request from the controller 50. The counter 11b accumulates and counts the number of carried document by the ADF 11. The counter 11b outputs the counted value of the number of carried document by the ADF 11 to the controller 50 as one type of data in the internal data 9 based on the request from the controller 50.

The scanner section 10 includes a group of sensors 10a and a counter 10b. The group of sensors 10a includes at least one sensor that monitors the operation status of movable part that becomes operative when the scanner section 10 reads the document. The aforementioned sensor 21a, for example, is included in the group of sensors 10a. The group of sensors 10a outputs the sensor measured value which is obtained by measuring the operation status of the movable part to the controller 50 as one type of data contained in the internal data 9 based on the request from the controller 50. The counter 10b accumulates and counts the number of read document by the scanner section 10. The counter 10b outputs counted value of the number of read document by the scanner section 10 to the controller 50 as one type of data in the internal data 9 based on the request from the controller 50.

The printer section 12 includes a group of sensors 12a and a counter 12b. The group of sensors 12a includes multiple sensors that monitor the operation status of movable parts that become operative when the printer section 12 produces a printed output. The aforementioned sensors 35, 36, 38, 40, 43 and 44, for example, are included in the group of sensors 12a. The group of sensors 12a outputs the sensor measured value which is obtained by measuring the operation status of the movable part to the controller 50 as one type of data contained in the internal data 9 based on the request from the controller 50. The counter 12b accumulates and counts the number of produced printed output by the printer section 12. The counter 12b outputs counted value of the number of produced printed output by the printer section 12 to the controller 50 as one type of data in the internal data 9 based on the request from the controller 50.

The paper feeder 13 includes a group of sensors 13a and a counter 13b. The group of sensors 13a includes at least one sensor that monitors the operation status of movable parts that become operative when the paper feeder 13 feeds the single paper. The group of sensors 13a outputs the sensor measured value which is obtained by measuring the operation status of the movable part to the controller 50 as a part of the internal data 9 based on the request from the controller 50. The counter 13b accumulates and counts the number of paper fed to the printer section 12. The counter 13b may be provided with each paper feeding cassette 14. The counter 13b outputs counted value of the number of fed paper to the controller 50 as a part of the internal data 9 based on the request from the controller 50.

The post-processing unit 2b includes a cutting unit 61, a punching unit 62, a stapler 63 and a folding unit 64.

The cutting unit 61 cuts the printed paper output from the printer section 12 in a predetermined size. The cutting unit 61 includes a group of sensors 61a and a counter 61b. The group of sensors 61a includes at least one sensor that monitors the operation status of movable part that becomes operative when the cutting unit 61 processes cutting. The group of sensors 61a outputs the sensor measured value which is obtained by measuring the operation status of the movable part to the controller 50 as one type of data contained in the internal data 9 based on the request from the controller 50. The counter 61b accumulates and counts the number of cut paper by the cutting unit 61. The counter 61b outputs counted value of the number of cut paper by the cutting unit 61 to the controller 50 as one type of data in the internal data 9 based on the request from the controller 50.

The punching unit 62 forms a punch hole in a predetermined position of the printed paper output from the printer section 12. The punching unit 62 includes a group of sensors 62a and a counter 62b. The group of sensors 62a includes at least one sensor that monitors the operation status of movable part that becomes operative when the punching unit 62 processes punching. The group of sensors 62a outputs the sensor measured value which is obtained by measuring the operation status of the movable part to the controller 50 as one type of data contained in the internal data 9 based on the request from the controller 50. The counter 62b accumulates and counts the number of punched paper by the punching unit 62. The counter 62b outputs counted value of the number of punched paper by the punching unit 62 to the controller 50 as one type of data in the internal data 9 based on the request from the controller 50.

The stapler 63 staples in a predetermined position of multiple printed sheets output from the printer section 12. The stapler 63 includes a group of sensors 63a and a counter 63b. The group of sensors 63a includes at least one sensor that monitors the operation status of movable part that becomes operative when the stapler 63 processes stapling. The group of sensors 63a outputs the sensor measured value which is obtained by measuring the operation status of the movable part to the controller 50 as one type of data contained in the internal data 9 based on the request from the controller 50. The counter 63b accumulates and counts the number of stapling by the stapler 63. The counter 63b outputs counted value of the number of stapling by the stapler 63 to the controller 50 as one type of data in the internal data 9 based on the request from the controller 50.

The folding unit 64 performs a folding process such as center-folding and/or three-folding of the printed sheet output from the printer section 12. The folding unit 64, for example, includes a group of sensors 64a and a counter 64b. The group of sensors 64a includes at least one sensor that monitors the operation status of movable part that becomes operative when the folding unit 64 performs the folding process. The group of sensors 64a outputs the sensor measured value which is obtained by measuring the operation status of the movable part to the controller 50 as one type of data contained in the internal data 9 based on the request from the controller 50. The counter 64*b* accumulates and counts the number of folding process performed by the folding unit 64. The counter 64*b* outputs counted value of the number of folding process to the controller 50 as one type of data in the internal data 9 based on the request from the controller 50.

Figure 5:
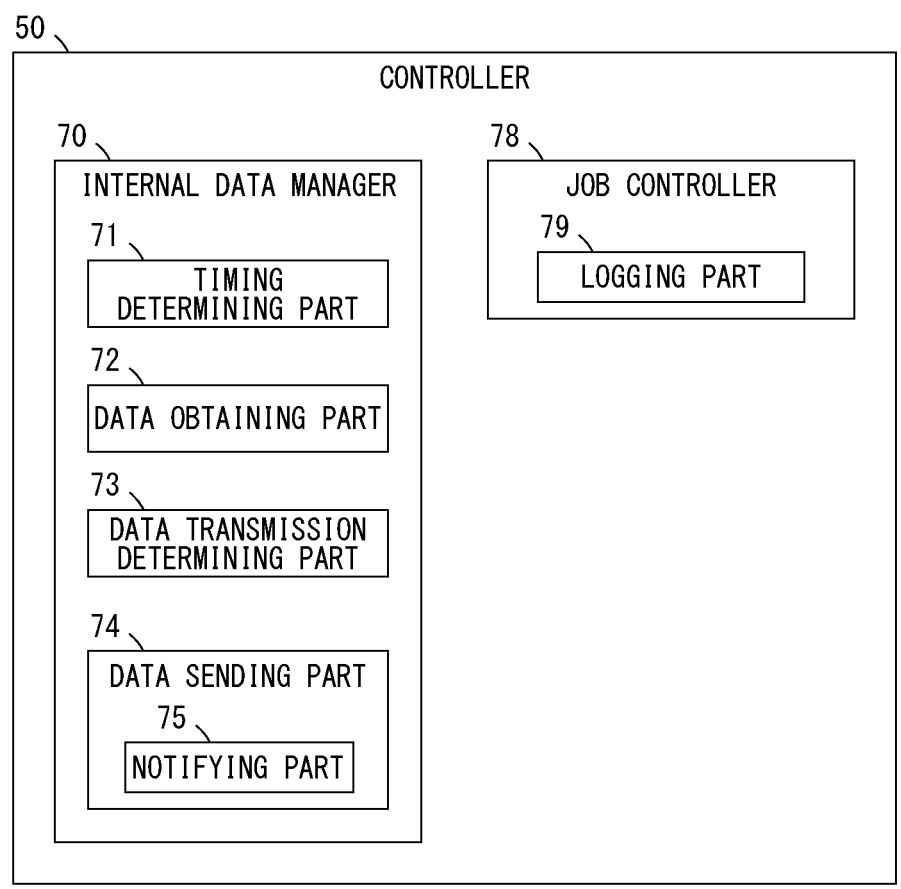
FIG. 5 illustrates a block diagram showing an example of a functional structure of a controller.

FIG. 5 illustrates a block diagram showing an example of a functional structure of the controller 50. The CPU 50*a* of the controller 50 executes the program 52 so that the controller 50 serves as an internal data manager 70 and a job controller 78. The internal data manager 70 manages the internal data such as the sensor measured value measured by each sensor mounted inside the image processing device 2 and/or the counted value of each counter. The job controller 78 controls processing of the job by the image processing device 2.

The job controller 78 controls the operations of the ADF 11, the scanner section 10, the printer section 12, the paper feeder 13 and the post-processing unit 2*b* to control processing of the job specified by the user. The job controller 78 includes a logging part 79. The logging part 79 stores the job processing history as the log data 54 when the job specified by the user is processed.

When the image processing device 2 is not used by the user for more than the predetermined period of time, the job controller 78 gives an instruction to the power controller 57 to shift to the sleep status. Thus, the power controller 57 shifts the power supply status of each part to the sleep status from the normal power supplied status. The job controller 78 then sets the power control flag 55 in a predetermined storage area in the storage device 51.

Once receiving a notification that the power controller 57 shifts the status from the power supplied status to the power terminated status, the job controller 78 sets the power control flag 55 in the predetermined storage area in the storage device 51.

The internal data manager 70 becomes operative at every timing to send the internal data 9 which is set in advance. The internal data manager 70 become operative sends the internal data 9 to the server 3. The internal data manager 70, however, does not send the internal data 9 to the server 3 every time. More specifically, the internal data manager 70 determines if it is required to send the internal data 9 to the server 3 at each transmission timing. Only if determining it is required to send, the internal data manager 70 sends the internal data 9 to the server 3. Hence, if determining it is not required to send the internal data 9 to the server 3, the internal data manager 70 does not send the internal data 9 to the server 3, resulting in reduction of the load on the server 3.

As illustrated in FIG. 5, the internal data manager 70 includes a timing determining part 71, a data obtaining part 72, a data transmission determining part 73 and a data sending part 74.

The timing determining part 71 determines whether or not it has become time to send the internal data 9 to the server 3. The image processing device 2 of the present preferred embodiment sends the internal data 9 to the server 3 at a periodical basis which is at every interval of constant time while it is in the normal status. The timing determining part 71 determines if the predetermined period of time has elapsed from the previous transmission timing, thereby determining if it is the time for the current transmission.

While the image processing device 2 is in the sleep status or the power terminated status, the power supply to the controller 50 is stopped. Even when the predetermined period of time has elapsed from the previous transmission timing, the timing determining part 71 is not enabled to detect the current transmission timing in real-time. The timing determining part 71, therefore, determines if the predetermined period of time has elapsed from the previous transmission timing soon after shifting to the normal power supplied status when the control to return to the normal power supplied status from the sleep status or the power terminated status is performed. The timing determining part 71 then determines it is the time for the current transmission if the predetermined period of time has elapsed. Consequently, the necessary internal data 9 may be sent to the server 3 at the timing at which the control to return to the normal power supplied status from the sleep status or the power terminated status is performed.

The data obtaining part 72 becomes operative when the timing determining part 71 determines it is the time for the current transmission. The data obtaining part 72 obtains the internal data 9 at the current transmission timing. More specifically, the data obtaining part 72 outputs a data obtaining request to aforementioned each group of sensors and each counter, and obtains the sensor measured values measured by the variety of sensors and the count values of the counters as the internal data 9. The data obtaining part 72 also obtains the log data 54 stored in the storage device 51 as the internal data 9.

FIG. 6 illustrates an example of the internal data 9 obtained by the data obtaining part 72. The internal data 9 contains a variety of count values such as the count value obtained from the scanner section 10 and/or the count value obtained from the printer section 12. Also, the internal data 9 contains the data showing the operation status of each movable part including the slid distance of the photoreceptor drum 31, the slid distance of the intermediate transfer belt 37, the running distance of the transfer roller 39 and the slid distance of the fixing belt 42. Moreover, the internal data 9 contains the log data 54. Every time the timing determining part 71 determines it is the time for the transmission, the data obtaining part 72 obtains the sensor measured value and/or the count value stored inside the device as the internal data 9. The internal data 9, therefore, includes the data that varies in response to the job processing.

In the example of FIG. 6, the internal data 9 contains whole data including the sensor data (the sensor measured value) received from the sensor that monitors the operation status of the internal part, the counter data (count value) added in response to the job processing and the log data 54 showing the job processing history. However, this is given not for limitation. The internal data 9 may be the data that contains at least one type of the sensor data (the sensor measured value), the counter data (count value) and the log data 54.

Referring back to FIG. 5, the data transmission determining part 73 determines whether or not to send the internal data 9 to the server 8 at the current transmission timing. The data transmission determining part 73 determines if it is necessary to send the latest internal data 9 obtained at the current transmission timing based on the change in the operation status of the image processing device 2 during the period from the previous data transmission timing to the current data transmission timing. More specifically, the change in the operation status of the image processing device 2 may be made during the period from the previous data transmission timing to the current data transmission timing. In such a case, the data transmission determining part 73 determines it is necessary to send the latest internal data 9 obtained at the current transmission timing to the server 3. The change in the operation status of the image processing device 2 may not be made during the period from the previous data transmission timing to the current data transmission timing. In such a case, the data transmission determining part 73 determines it is not necessary to send the latest internal data 9 obtained at the current transmission timing to the server 3.

If the job is processed during the period from the previous data transmission timing to the current data transmission timing, for example, the data transmission determining part 73 determines that the change is made in the operation status of the image processing device 2. That is because, the change is made in the operation status of the movable part due to the job processing. The data transmission determining part 73 refers to the log data 54 obtained by the data obtaining part 72, so that it is enabled to determine if the job is processed during the period from the previous data transmission timing to the current data transmission timing.

Even when the job is not processed during the period from the previous data transmission timing to the current data transmission timing, the power supply status may be controlled to shift to the sleep status or the power terminated status. In this case, the data transmission determining part 73 determines that the change is made in the operation status of the image processing device 2. After the power supply status is returned to the normal power supplied status from the sleep status or the power terminated status, the fixing unit 28 of the printer section 12 warms up and it may make the change in at least the operation status of the movable part of the fixing unit 28 due to the warming up. The data transmission determining part 73, for example, checks if the power control flag 55 is set in the storage device 51, so that it is enabled to determine if the power supply status is controlled to shift to the sleep status or the power terminated status during the period from the previous data transmission timing to the current data transmission timing.

The data transmission determining part 73 may detect the change in the operation status by determining whether or not the internal data 9 obtained at the current transmission timing is varied from the internal data 9 obtained at the previous transmission timing. If the data contained in the internal data 9 varies, it is possible to have the change in the operation status of the image processing device 2 during the period from the previous data transmission timing to the current data transmission timing. Once the latest internal data 9 is obtained by the data obtaining part 72, the data transmission determining part 73 reads the previous data 53 in the storage device 51, and compares the latest internal data 9 and the read previous data 53. The data transmission determining part 73 is then enabled to determine if the data contained in the latest internal data 9 is varied. There may be the variation in the data. In this case, the data transmission determining part 73 determines there is the change in the operation status of the image processing device 2.

Even when the job is processed by the image processing device 2, the data in the internal data 9 varies. By comparing the previous internal data 9 and the latest internal data 9, the data transmission determining part 73 is allowed to determine if the job is processed during the period from the previous data transmission timing to the current data transmission timing.

After the determination by the data transmission determining part 73, the internal data manager 70 brings the data sending part 74 into operation. When the data transmission determining part 73 determines it is necessary to send the latest internal data 9 to the server 3, the data sending part 74 sends the internal data 9 to the server 3. The data sending part 74 may send whole data contained in the latest internal data 9 obtained by the data obtaining part 72.

The latest internal data 9 obtained by the data obtaining part 72 may contain the data which is totally the same as the data contained in the previous data 53. In this case, it is wasting to send the same data as the previous one to the server 3 and it may increase a load on the server 3. When the job is processed during the period from the previous data transmission timing to the current data transmission timing, the data sending part 74 obtains detailed information of the job, and identifies the job processed by the image processing device 2. It is preferable for the data sending part 74 to extract data relating to the job processed by the image processing device 2 in the latest internal data 9 obtained by the data obtaining part 72, and send the extracted data to the server 3.

The scan job may be processed during the period from the previous data transmission timing to the current data transmission timing, for example. The data sending part 74 then extracts data relating to the scan function in the currently obtained internal data 9, and sends the extracted data to the server 3. In this case, the data sending part 74 does not send data relating to the print function to the server 3. The server 3 is not required to process the data relating to the print function, resulting in reduction of the load.

The print job may be processed during the period from the previous data transmission timing to the current data transmission timing, for example. The data sending part 74 then extracts the data relating to the print function in the currently obtained internal data 9, and sends the extracted data to the server 3. In this case, the data sending part 74 does not send the data relating to the scan function to the server 3. The server 3 is not required to process the data relating to the scan function, resulting in reduction of the load.

The print job may be processed during the period from the previous data transmission timing to the current data transmission timing, and the print job may be to produce a black and white printed output. The data sending part 74 then may only extract data obtained from the image forming unit 30K corresponding to K (black) of data obtained from four image forming units 30Y, 30M, 30C and 30K, and send the extracted data to the server 3.

The print job may be processed during the period from the previous data transmission timing to the current data transmission timing, and the post-processing unit 2b processes the post-processing such as punching and/or stapling at the processing of the print job. When sending the data relating to the print function to the server 3, the data sending part 74 sends data obtained from the post-processing unit 2b to the server 3 at the same time. The post-processing unit 2b may not process the post-processing such as punching and/or stapling at the processing of the print job. The data sending part 74 then does not send the data obtained from the post-processing unit 2b to the server 3. Consequently, the server 3 is not required to process the data relating to the post-processing unit 2b, resulting in reduction of the load.

The data sending part 74 compares the latest internal data 9 obtained by the data obtaining part 72 and the previous data 53, and only extracts the data that has the variation therein from the previous data 53 to the server 3. The data sending part 74 may only send the data that varies from the previous data 53. As a result, information amount of the internal data 9 received by the server 3 may be decreased, resulting in reduction of the load on the server 3.

Moreover, the data sending part 74 may determine whether or not certain data of the plurality of data contained in the latest internal data 9 varies from the previous data 53. When the certain data varies from the previous data 53, the data relating to the certain data may also be sent to the server 3 at the same time. It is assumed, for example, the count value of the scan counter contained in the latest internal data 9 is increased from the count value contained in the previous data 53. In this case, the data relating to the scan function may be sent to the server 3 together with the count value of the scan counter. Also, it is assumed, for example, the count value of the print counter contained in the latest internal data 9 is increased from the count value contained in the previous data 53. In this case, the data relating to the print function may be sent to the server 3 together with the count value of the print counter. Consequently, even without comparison of the whole plurality of the data contained in the internal data 9 with the previous data 53, the data sending part 74 is enabled to effectively extract the data that has a possibility of the variation in response to the job processing and send the extracted data to the server 3.

The control to return to the normal power supplied status from the sleep status or the power terminated status may be performed during the period from the previous data transmission timing to the current data transmission timing. In such a case, the data sending part 74 sends at least the data relating to the fixing unit 28 to the server 3. The control to return to the normal power supplied status from the sleep status or the power terminated status leads the fixing unit 28 to warm up. Thus, at least the data relating to the fixing unit 28 is sent to the server 3 by the data sending part 74, so that the server 3 is enabled to figure out the change in the operation status of the fixing unit 28 due to the warming up.

The data sending part 74 includes a notifying part 75. The notifying part 75 becomes operative when the data transmission determining part 73 determines it is not necessary to send the latest internal data 9 to the server 3. The notifying part 75 notifies the server 3 that the internal data 9 is not to be sent at the current transmission timing. As a result, the server 3 is enabled to figure out that the internal data 9 is not to be sent from the image processing device 2, and that the image processing device 2, a sender of the notification, is in operation normally. To be more specific, this notification is for avoiding the server 3 to determine that the image processing device 2 is in an abnormal status so that it cannot send the internal data 9. The information amount that enables the notifying part 75 to notify the server 3 that the internal data 9 is not to be sent is less than the information amount of each data contained in the internal data 9. The information amount for the notification may be few bites, for instance. Hence, even when the notifying part 75 notifies the server 3 that the data is not to be sent, the notification does not cause increase in the load on the server 3.

Figure 7:
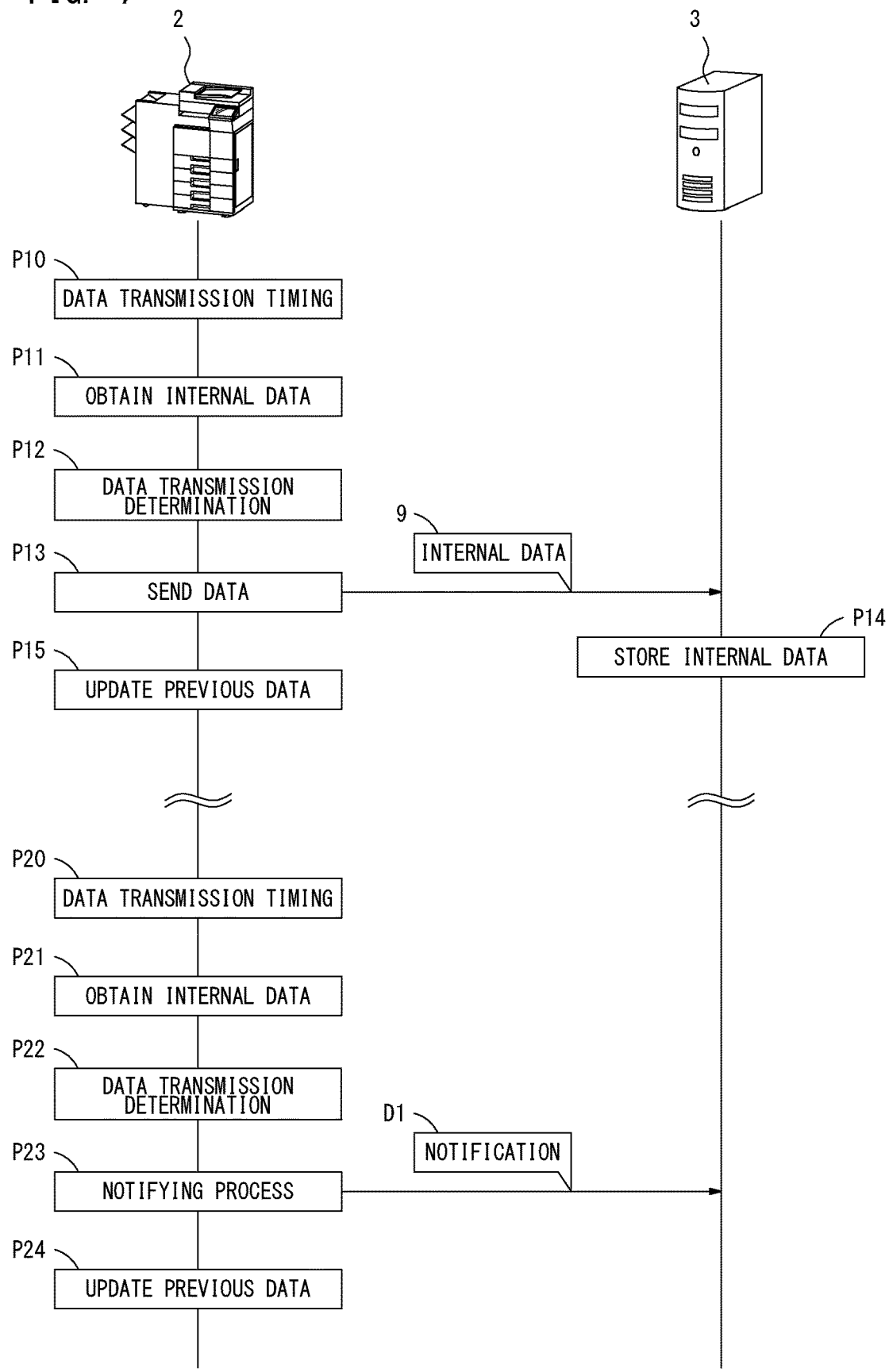
FIG. 7 is a flow diagram showing an exemplary operation performed at the image processing device.

FIG. 7 is a flow diagram showing an exemplary operation performed at the image processing device 2. After determining it is the transmission timing for the data transmission to the server 3 (process P10), the image processing device 2 obtains the internal data 9 such as the sensor measured value and/or the count value (process P11). The image processing device 2 then determines whether or not to send the internal data 9 obtained in process P11 to the server 3 based on the change in the operation status during the period from the previous data transmission timing to the current data transmission timing (process P12). The internal data 9 may be to be sent as a result of the determination. In this case, the image processing device 2 sends the internal data 9 obtained in process P11 to the server 3 (process P13). In this process, the image processing device 2 may send the whole of the plurality of data contained in the internal data 9 to the server 3 or may extract at least one data from among the plurality of data contained in the internal data 9 and send the extracted data to the server 3 as described earlier.

Once receiving the internal data 9 from the image processing device 2, the server 3 stores the received internal data 9 (process P14). The server 3 obtains the internal data 9 from each of the multiple image processing devices 2, and stores the obtained internal data 9. More specifically, the server 3 collects and stores the internal data 9 from each of the multiple image processing devices 2 installed in various places.

After sending the internal data 9 to the server 3, the image processing device 2 updates the previous data 53 in the storage device 51 (process P15). To be more specific, the image processing device 2 rewrites the previous data 53 using the internal data 9 obtained in process P11. Consequently, the previous data 53 stored in the storage device 51 will be the data that matches with the latest interval data 9 stored in the server 3.

When the image processing device 2 determines it is the next transmission timing (process P20), it obtains again the internal data 9 such as the sensor measured value and/or the count value (process P21). The image processing device 2 determines whether or not to send the internal data 9 obtained in process P21 to the server 3 based on the change made in the operation status during the period from the previous data transmission timing to the current data transmission timing (process P22). The image processing device 2 may determine it is not necessary to send the internal data 9 to the server 3 as there is no change in the operation status during the period from the previous data transmission timing to the current data transmission timing. In this case, the image processing device 2 sends a notification D1 showing not to send the internal data 9 to the server 3 (process P23). More specifically, in such a case, the image processing device 2 does not send the internal data 9 to the server 3 so that the load on the server 3 may be reduced. The image processing device 2 rewrites the previous data 53 using the internal data 9 obtained in process P21, and updates the previous data 53 in the storage device 51 (process P24).

Figure 8:
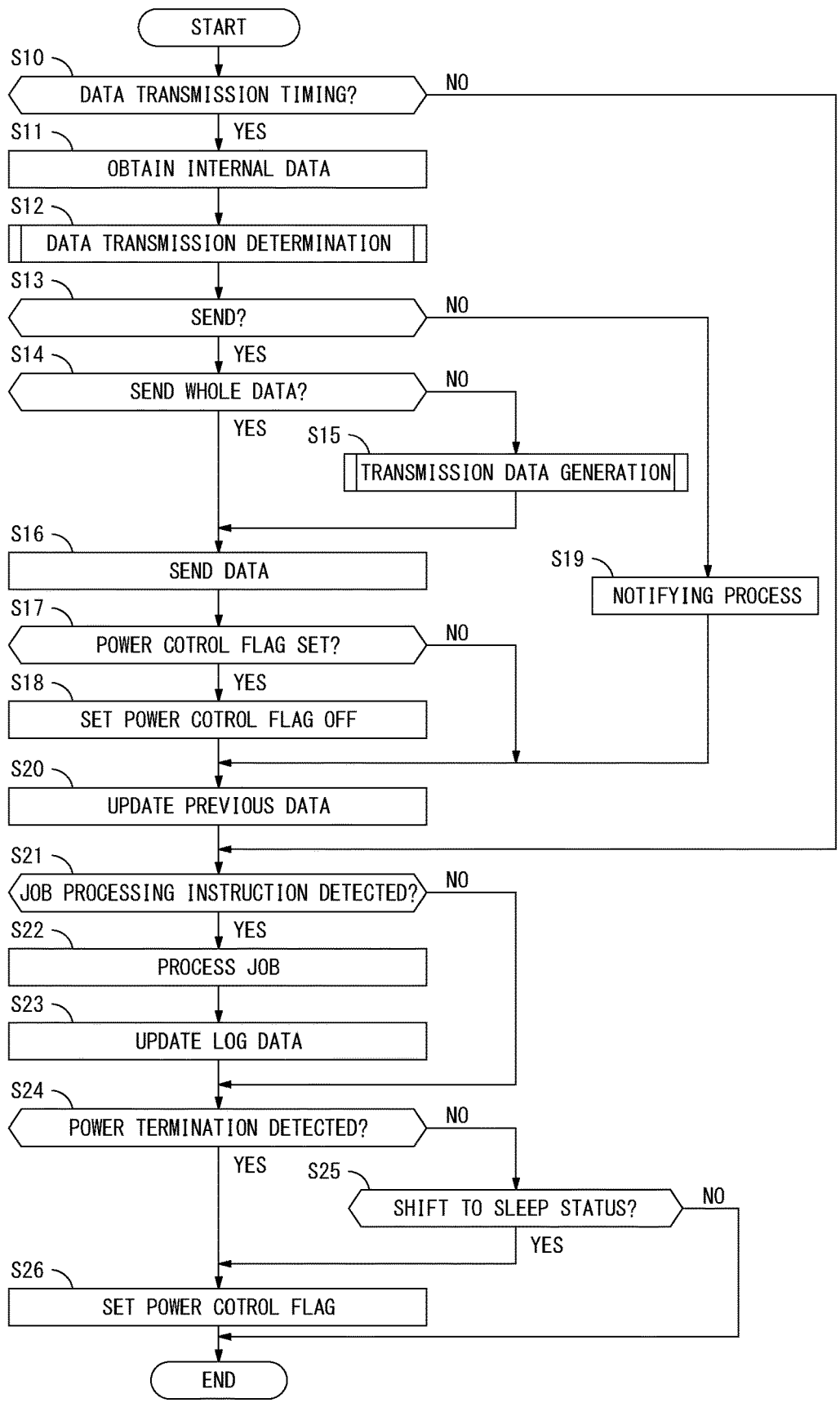
FIG. 8 illustrates a flow diagram explaining an exemplary procedure of a process performed at the image processing device.
Figure 9:
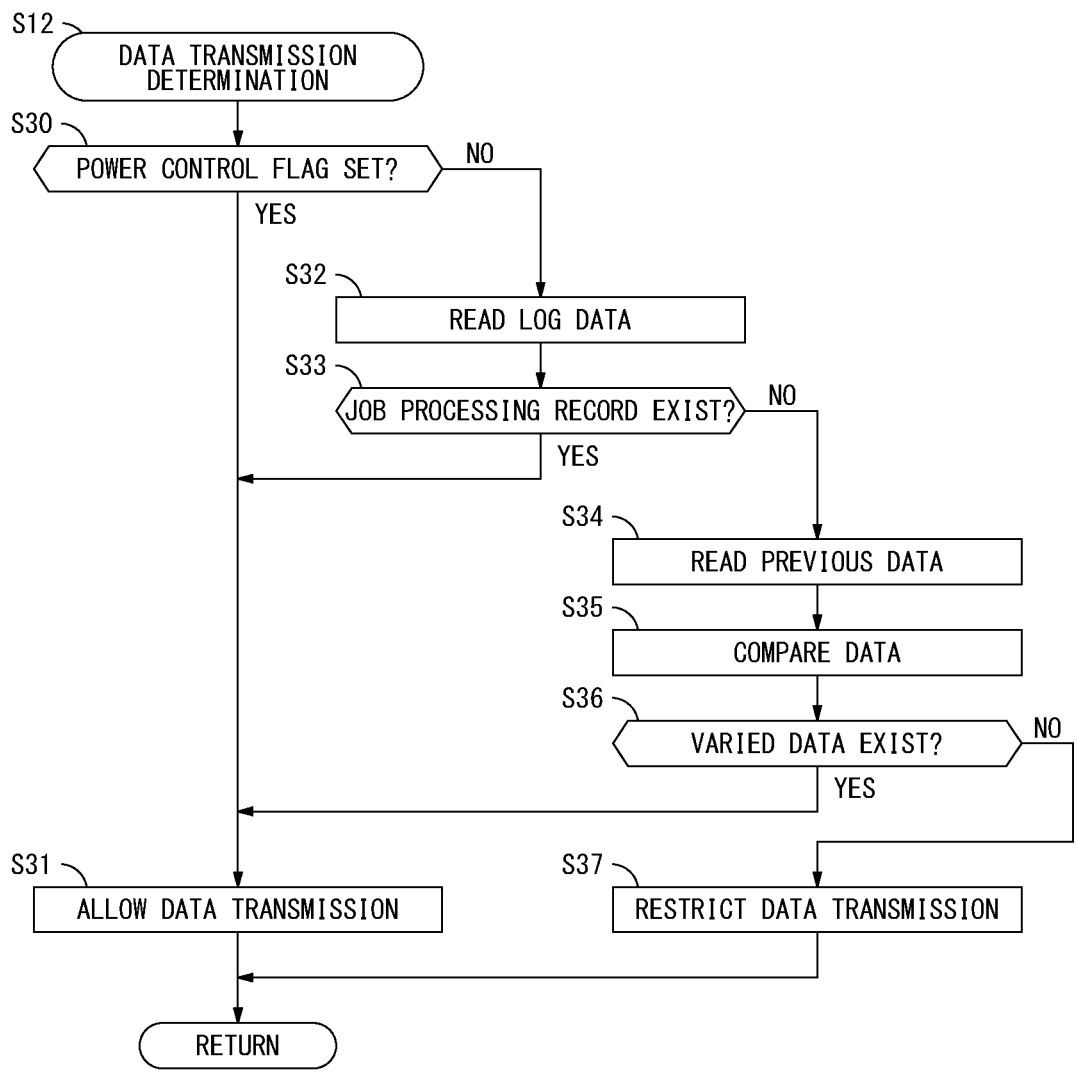
FIG. 9 illustrates a flow diagram explaining an exemplary procedure of a data transmission determination in detail.

A process sequence as described above performed at the image processing device 2 is explained next. FIGS. 8 to 10 illustrate flow diagrams explaining an exemplary procedure of a process performed at the image processing device 2. This process is performed when the CPU 50a of the controller 50 executes the program 52, and is repeatedly performed at every interval of constant time, for instance. Upon start of the process, the image processing device 2 determines if it is the data transmission timing to send the internal data 9 to the server 3 (step S10). In this step, it is determined if the present time is the data transmission timing. If the present time matches with the data transmission timing, the result in this step is determined to be YES. When the determination is made soon after the power supplied status is returned from the sleep status or the power terminated status and the data transmission timing has already passed at the present time, the result in this step is determined to be YES.

The present time may be the data transmission timing (when a result of step S10 is YES). In this case, the image processing device 2 obtains the internal data 9 from the sensor or the counter mounted inside (step S11). The image processing device 2 also obtains the log data 54 stored in the storage device 51 as the internal data 9. After obtaining the internal data 9, the image processing device 2 performs a data transmission determination (step S12).

FIG. 9 illustrates a flow diagram explaining an exemplary procedure of the data transmission determination (step S12) in detail. Upon start of the data transmission determination, the image processing device 2 determines if the power control flag 55 is set in the storage 51 (step S30). When the power control flag 55 is set (when a result of step S30 is YES), it means the control to return to the normal power supplied status from the sleep status or the power terminated status is performed during the period from the previous data transmission timing to the current data transmission timing. Thus, the image processing device 2 allows the data transmission to the server 3 (step S31).

When the power control flag 55 is not set (when a result of step S30 is NO), the image processing device 2 reads the log data 54 in the storage device 51 (step S32), and determines if there is any record of the job processing during the period from the previous data transmission timing to the current data transmission timing (step S33). If there is the record of the job processing (when a result of step S33 is YES), the image processing device 2 allows the data transmission to the server 3 (step S31).

If there is no record of the job processing (when a result of step S33 is NO), the image processing device 2 reads the previous data 53 (step S34), and compares the internal data 9 currently obtained and the previous data 53 (step S35). The image processing device 2 then determines if there is any data varies from the previous data 53 among the plurality of data contained in the internal data 9 currently obtained (step S36). The data that may vary from the previous data 53 may be contained in the latest internal data 9 (when a result of step S36 is YES). In this case, the image processing device 2 allows the data transmission to the server 3 (step S31). The data that may vary from the previous data 53 may not be contained in the latest internal data 9 (when a result of step S36 is NO). In this case, the image processing device 2 restricts the data transmission to the server 3 (step S37). As described above, the data transmission determination ends.

Referring back to FIG. 8, the image processing device 2 determines if the data transmission is allowed through the data transmission determination (step S13). When the data transmission is allowed (when a result of step S13 is YES), the image processing device 2 determines whether or not to send the whole data contained in the internal data 9 to the server 3 (step S14). The whole data contained in the internal data 9 may be sent to the server 3 (when a result of step S14 is YES). In this case, the process at the image processing device 2 proceeds to step S16. If it is not necessary to send the whole data in the internal data 9 to the server 3 (when a result of step S14 is NO), the image processing device 2 performs a transmission data generation (step S15).

FIG. 10 illustrates a flow diagram explaining an exemplary procedure of the transmission data generation (step S15) in detail. Upon start of the process, the image processing device 2 refers to the log data 54 and if there is the record of the job processing during the period from the previous data transmission timing to the current data transmission timing (step S40). There may be the record of the job processing. In this case, the image processing device 2 identifies the job processed during the period (step S41), and extracts the data that has a possibility of being varied in response to the job processing as data to send from among the plurality of data contained in the internal data 9 (step S42). There may be the records of the multiple job processing during the period from the previous data transmission timing to the current data transmission timing. In such a case, the image processing device 2 extracts the data to send based on each of the multiple jobs. If there is no record of the job processing in the log data 54 (when a result of step S40 is NO). In this case, the process in steps S41 and S42 is skipped.

The image processing device 2 then reads the previous data 53 (step S43), and compares the latest internal data 9 and the previous data 53 (step S44). The image processing device 2 determines if there is the data that has varied from the previous data 53 among the plurality of data contained in the latest internal data 9 (step S45). There may be the data that has been varied from the previous one (when a result of step S45 is YES). The image processing device 2 then extracts the varied data as the data to send (step S46). The image processing device 2 may not only extract the varied data itself as the data to send but also the data relating to the data varied from the previous one. If there is no data varied from the previous one (when a result of step S45 is NO), the process in step S46 is skipped.

The image processing device 2 determines if the power control flag 55 is set (step S47). When the power control flag 55 is set (when a result of step S47 is YES), the image processing device 2 extracts the data relating to the fixing unit 28 from among the data contained in the internal data 9 as the data to send (step S48). The image processing device 2 then switches the power control flag 55 to off (step S49). When the power control flag 55 is not set (when a result of step S47 is NO), the process in steps S48 and S49 is skipped.

The image processing device 2 generates transmission data to send to the server 3 the data to send extracted in above-described each step as a whole (step S50). The transmission data generated in this step contains only a part of the plurality of data contained in the internal data 9. The information amount of the transmission data is less than the information amount of the internal data 9. As described above, the transmission data generation (step S15) ends.

Referring back to the flow diagram of FIG. 8, the image processing device 2 sends the internal data 9 to the server 3 (step S16). When, for example, the transmission data generation (step S15) is performed, the whole of the plurality of data contained in the internal data 9 is not sent to the server 3 in step S16. The transmission data generated in the transmission data generation (step S15) is sent to the server 3. The information amount to send to the server 3 can be kept small, resulting in reduced load on the server 3.

The image processing device 2 determines if the power control flag 55 is set (step S17). When the power control flag 55 is set (when a result of step S17 is YES), the image processing device 2 switches the power control flag 55 to off (step S18).

The data transmission may be restricted through the data transmission determination (step S12) (when a result of step S13 is NO). In this case, the image processing device 2 performs a notification to notify the server 3 that the internal data 9 is not be sent (step S19).

The image processing device 2 updates the previous data 53 based on the internal data 9 obtained in step S11 (step S20). When the image processing device 2 determines it is not the data transmission timing (when a result of step S10 is NO), the image processing device 2 skips the process in steps S11 to S20.

The image processing device 2 then determines whether or not the job processing instruction by the user is detected (step S21). The job processing instruction may be detected (when a result of step S21 is YES). In this case, the image processing device 2 processes the job specified by the user (step S22), and updates the log data 54 after the job processing (step S23). When the job processing instruction is not detected (when a result of step S21 is NO), the process in steps S22 and S23 is skipped.

The image processing device 2 determines if the operation to turn off the power is detected by the power controller 57 (step S24). The power may not be turned off (when a result of step S24 is NO). In this case, the image processing device 2 determines whether or not the power supply status is shifted to the sleep status (step S25). When the power is turned off (when a result of step S24 is YES) or the power supply status is shifted to the sleep status (when a result of step S25 is YES), the image processing device 2 sets the power control flag 55 in the storage device 51 (step S26). When the power supply status is not shifted to the sleep status (when a result of step S25 is NO), the process in step S26 is skipped.

The image processing device 2 performs the above-described process so that it may determine whether or not it is necessary to send the internal data 9 based on the change in the operation status during the period from the previous data transmission timing to the current data transmission timing at every timing at which the internal data 9 is to be sent to the server 3. Only if the image processing device 2 determines it is necessary to send the internal data 9 to the server 3 as a result of the determination, it sends the internal data 9 to the server 3. In other words, when the image processing device 2 determines it is not necessary to send the internal data 9 at the current transmission timing, it does not send the internal data 9 to the server 3. Thus, the interval of receiving the internal data 9 at the server 3 may be extended so that a frequency of the process performed by the server 3 at the receipt of the internal data 9 may be decreased.

When sending the internal data 9, the image processing device 2 extracts the data to send to the server 3 from among the plurality of data contained in the internal data 9, and only sends the extracted data to the server 3. Compared to the case where the whole data contained in the internal data 9 is sent to the server 3, the internal data 9 is enabled to be sent in a manner that reduces the information amount that received by the server 3. Also in this point, the load on the server 3 may be reduced.

According to the prediction system 1 including the above-described image processing device 2, a process load on the server 3 to collect the internal data 9 from each of the multiple image processing devices 2 installed in various places is enabled to be reduced. Even when the server 3 collects the internal data 9 from various places around the world as so called big data, the effective process may be performed.

As described above, the frequency of sending the internal data by the image processing device to the server or amount of data sent by the image processing device to the server may be reduced, resulting in effective reduction in the load on the server.

Although the embodiments of the present invention have been described and illustrated in detail, it is clearly understood that the same is by way of illustration and example only and not limitation, the scope of the present invention should be interpreted by terms of the appended claims.

Modifications

While the preferred embodiments of the present invention have been described above, the present invention is not limited to the preferred embodiments. Various modifications may be applied to the present invention.

In the above-described present preferred embodiment, for example, the data obtaining part 72 obtains the internal data 9 from the group of sensors and/or the counter of each part when the timing determining part 71 determines it is the data transmission timing. However, this is given not for limitation. The data obtaining part 72 may always monitor the group of sensors and/or the counter of each part and store and manage the latest interval data 9 in the storage such as the storage device 51 regardless of the data transmission timing. In such a case, when the timing determining part 71 determines it is the data transmission timing, the data obtaining part 72 reads the latest internal data 9 in the storage device 51 so that it may obtain the latest internal data 9.

In the above-described present embodiment, the image processing device 2 is constructed by a device such as the MFP including multiple functions such as the scan function, the print function and the copy function. The image processing device 2 does not have to include the multiple functions such as the scan function, the print function and the copy function. The image processing device 2, for example, may be a scanner only including the scan function or a printer only including the print function. The image processing device 2 may be a device including a function except for the scan function and/or the print function.

The program 52 of the present preferred embodiment executed by the CPU 50a is installed in advance in the image processing device 2. The program 52 does not always have to be installed in advance in the image processing device 2. The program 52 may be the target of trading. The program 52 then may be provided with the image processing device 2 over an internet in a manner that enables the user to download, or may be provided with the image processing device 2 in a manner that is recorded on a computer readable recording medium such as a CD-ROM or a USB memory.

What is claimed is:

1. An image processing device capable of repeatedly sending internal data stored inside the device to a server at a predetermined timing, comprises:
   a hardware processor that:
      obtains the internal data from said inside the device at every data transmission timing, wherein the transmission timing is set on a periodic basis based on a constant interval of time;
      determines whether or not to send the latest internal data obtained at the current data transmission timing to said server based on a change in an operation status of a movable part in the image processing device during a period from the previous data transmission timing to the current data transmission timing; and
      sends the latest internal data to said server when determining to send the latest internal data to said server.

2. The image processing device according to claim 1, wherein
   the hardware processor further controls a processing of a job, and
   the internal data obtained from said inside the device contains data that varies in response to the processing of the job.

3. The image processing device according to claim 1, wherein
   the internal data obtained from said inside the device contains at least one type of data of sensor data received from a sensor that monitors the operation status of an internal part, counter data added in response to the processing of the job and log data showing a job processing history.

4. The image processing device according to claim 1, wherein
the hardware processor compares the previous internal data obtained at the previous data transmission timing and the latest internal data, and detects the change in the operation status during said period.

5. The image processing device according to claim 1, further comprising:
a power controller that controls a power supply status, wherein
the hardware processor detects the change in the operation status during said period when the control to return from a sleep status or a power terminated status to a normal power supplied status is performed by said power controller during said period.

6. The image processing device according to claim 5, wherein
if the current data transmission timing has already passed when the power supply status is returned to said normal power supplied status, the hardware processor determines whether or not to send the latest internal data to said server at a timing at which the power supply status is returned to said normal power supplied status.

7. The image processing device according to claim 5, further comprising:
an image forming part that transfers a toner image to a printing sheet; and
a fixing part that fixes the toner image transferred to said printing sheet, wherein
the internal data obtained from said inside the device contains data relating to said fixing part, and
the hardware processor sends at least the data relating to said fixing unit to said server when the control to return from the sleep status or the power terminated status to the normal power supplied status is performed during said period.

8. The image processing device according to claim 1, wherein
when the change in the operation status is detected during said period, the hardware processor determines to send the latest internal data to said server if the latest internal data is varied from the previous internal data obtained at the previous data transmission timing.

9. The image processing device according to claim 1, wherein
the hardware processor notifies said server that the latest internal data is not to be sent when determining not to send the latest internal data to said server.

10. The image processing device according to claim 1, wherein
the internal data stored said inside the device contains a plural types of data, and
the data varied from the previous internal data among said plural types of data contained in the latest internal data is sent to said server.

11. The image processing device according to claim 10, wherein
the hardware processor sends the data relating to the data varied from the previous internal data of said plural types of data contained in the latest internal data is sent to said server.

12. The image processing device according to claim 1, further comprising:
a scanner that processes a scan job; and
a printer that processes a print job, wherein
the internal data obtained from said inside the device contains data relating to a scan function and data relating to a print function, and
when said scan job is processed during said period, the hardware processor sends the data relating to said scan function to said server at the current data transmission timing and does not send the data relating to said print function to said server.

13. The image processing device according to claim 12, further comprising:
a post-processing unit capable of performing a post-processing for the printing sheet output from said printer in response to the processing of said print job, wherein
the internal data obtained from said inside the device contains data relating to said post-processing unit, and
the hardware processor does not send the data relating to said post-processing unit when said post-processing unit does not become operative in response to said print job processed during said period.

14. The image processing device according to claim 1, further comprising:
a scanner that processes a scan job; and
a printer that processes a print job, wherein
the internal data obtained from said inside the device contains data relating to a scan function and data relating to a print function, and
when said print job is processed during said period, the hardware processor sends the data relating to said print function to said server at the current data transmission timing and does not send the data relating to said scan function to said server.

15. The image processing device according to claim 1, wherein only new data is extracted and sent to the server.

16. A non-transitory recording medium storing a computer readable program to be executed by a hardware processor in an image processing device capable of repeatedly sending internal data stored inside the device to a server at a predetermined timing, execution of the computer readable program by the hardware processor in said image processing device causing the hardware processor to perform:
obtains the internal data from said inside the device at every data transmission timing, wherein the transmission timing is set on a periodic basis based on a constant interval of time;
determines whether or not to send the latest internal data obtained at the current data transmission timing to said server based on a change in an operation status of a movable part in the image processing device during a period from the previous data transmission timing to the current data transmission timing; and
sends the latest internal data to said server when determining to send the latest internal data to said server.

17. The non-transitory recording medium according to claim 16, wherein only new data is extracted and sent to the server.

* * * * *